United States Patent [19]
Kitagawa

[11] Patent Number: 5,411,220
[45] Date of Patent: May 2, 1995

[54] FILM CASSETTE WITH FILM SEPARATING CLAW

[75] Inventor: Kiichiro Kitagawa, Kanagawa, Japan

[73] Assignee: Fuji Photo Film Co., Ltd., Minami-ashigara, Japan

[21] Appl. No.: 779,244

[22] Filed: Oct. 18, 1991

[30] Foreign Application Priority Data

Oct. 18, 1990 [JP] Japan .................................. 2-280301

[51] Int. Cl.$^6$ .............................................. G03B 17/26
[52] U.S. Cl. .................................................. 242/348.3
[58] Field of Search ..................... 242/71.9, 71, 71.1, 242/71.7, 71.8, 348, 348.3, 348.4; 354/275

[56] References Cited

U.S. PATENT DOCUMENTS

| | | |
|---|---|---|
| 2,336,278 | 12/1943 | Mihalyi . |
| 2,360,255 | 10/1944 | Mihalyi . |
| 2,364,381 | 12/1944 | Mihalyi . |
| 2,521,935 | 9/1950 | Monroe . |
| 2,552,200 | 5/1951 | Mihalyi . |
| 3,467,340 | 9/1969 | Rosenburgh . |
| 3,556,435 | 1/1971 | Wangerin ............... 242/210 |
| 3,627,229 | 12/1971 | Wangerin ............... 242/210 |
| 3,627,230 | 12/1971 | Wangerin ............... 242/210 |
| 3,677,499 | 7/1972 | Wangerin ............... 242/210 |
| 3,797,777 | 3/1974 | Hosono et al. ......... 242/197 |
| 4,834,306 | 5/9189 | Robertson ............ 242/71.9 X |
| 4,875,637 | 10/1989 | Beach ..................... 242/71.1 |
| 4,883,236 | 11/1989 | Niedospial ........... 242/71.9 X |
| 4,899,948 | 2/1990 | Niedospial ........... 242/71.8 X |
| 4,962,401 | 10/1990 | Takahashi ............... 354/275 |
| 5,003,334 | 3/1991 | Pagano et al. .......... 354/275 |
| 5,031,852 | 7/1991 | Dowling et al. ........ 242/71.1 |

FOREIGN PATENT DOCUMENTS 2921379 11/1980 Germany .

Primary Examiner—Daniel P. Stodola
Assistant Examiner—Eileen A. Dunn
Attorney, Agent, or Firm—Sughure, Mion, Zinn, Macpeak & Seas

[57] ABSTRACT

A photographic film cassette includes a spool housed within a cassette shell in which rotation of the spool causes a film leader of a photographic film to advance externally of the cassette shell. Circumferential lips are formed on flanges of the spool to project toward a film roll, and contact edges of an outermost turn of the film roll to prevent the film roll from loosening. A separating claw mechanism is formed in a film passageway defined by the cassette shell, and separates the film leader from the film roll to guide the film leader to a film passage mouth. Guide projections are formed inwardly from the separating claw in the cassette shell, and press peripheral edges of the flanges to be spaced from the film roll. The film roll is released from the circumferential lips, while avoiding loosening of the film roll.

17 Claims, 4 Drawing Sheets

FILM CASSETTE WITH FILM SEPARATING CLAW

BACKGROUND OF THE INVENTION

The present invention relates to a photographic film cassette, and more particularly to an improved photographic film cassette in which the rotation of a spool therein having a photographic film attached thereto causes a leader of the film to be advanced externally of a cassette shell.

A conventional film cassette has photographic film positioned therein such that the film leader does not protrude from the cassette shell prior to loading the film cassette in a camera. Such a film cassette is easily loaded into the camera. Simple film-advancing mechanisms of the camera are used with the film cassette and have a construction which rotates the spool to unwind the film, thereby causing the film leader to move through a film passageway and exit from the film cassette.

One conventional film cassette, disclosed in U.S. Pat. No. 4,834,306, has a spool provided with flanges or disks on both lateral sides of a photographic film roll such that circumferential lips are formed on the periphery of the disks to project in a direction along the length of the film cassette. Spreading projections or guide projections are formed on an inside surface of the cassette shell in a film entranceway where the film is directed to a film passage mouth, and deform the disks outwardly to widen the interval therebetween. The guide projections also are formed as separating claws which separate the film leader from the outermost turns of the photographic film roll to direct the film leader to the film passage mouth. The guide projections continuously spread the disks in the film entranceway to disengage the outermost turn of the roll from the circumferential lips. Therefore, the film leader is advanced to exit the cassette shell through the film passage mouth by rotating the spool in a direction to unwind the film.

However, the film cassette described above has a disadvantage in that the spool rotation cannot be transmitted to the outermost turn of the film when the guide projections are formed in the film passageway entrance, because the film roll is loosened erroneously in a position under the film entrance. Thus, the film leader fails to advance through the film passage mouth even though the spool is unwound.

Another problem is that the film leader may be prevented from advancing by the guide projections contacting the film, since the guide projections contact the top of the circumferential lips of the disks to release the outermost turn of the film roll from the circumferential lips.

SUMMARY OF THE INVENTION

In view of the foregoing problems, an object of the present invention is to provide a photographic film cassette in which rotation of the spool reliably advances the film leader outside of the cassette shell.

To achieve the above and other objects, features and advantages of this invention, a film cassette according to the present invention includes a pair of circumferential lips formed on inner walls of flanges to project toward a film roll to contact lateral edges of an outermost turn thereof, thereby preventing the film roll from loosening. A separating claw member is positioned internally of a film passageway, and separates a film leader from the film roll to guide the film leader to a film passage mouth. A film releasing mechanism is positioned inwardly from the separating claw in the cassette shell and partially presses peripheral edges of the flanges apart from the film roll to release the film roll from the circumferential lips, thereby preventing the film roll from loosening. Rotation of the spool is transmitted reliably to the outermost turn of the film roll, and advances the film leader externally of the cassette shell.

Further, portions of the peripheral edges of the flanges extend in a direction in which a flange diameter is enlarged from positions of the projected circumferential lips, whereas the film releasing mechanism partially contacts the peripheral edge portions of the flanges to press the flanges. With this construction, the film leader is never inhibited or prevented from advancing by the guide projections.

According to a preferred embodiment, the film releasing mechanism presses the peripheral edge portions of the flanges to satisfy a condition:

$$D_0 + 0.1 \leq D_1 \leq D_0 + 0.5$$

where $D_1$ (mm) is a distance defined between respective tops of the circumferential lips, and $D_0$ (mm) is a width of the film.

In the conventional film cassette, the pair of separating claws for separating the film leader would be integrally formed with the two guide projections for spreading the disks. However, with the inventive structure, there is no fear of the film jamming caused by the timing of the two separating claws separating the film leader from the roll being slightly different, even when the leading end of the film leader is obliquely cut.

BRIEF DESCRIPTION OF THE DRAWINGS

The above objects, features and advantages of the present invention will become more apparent from the following detailed description when read in connection with the accompanying drawings, in which.

DETAILED DESCRIPTION OF THE PREFERRED EMBODIMENTS

Figure 1:
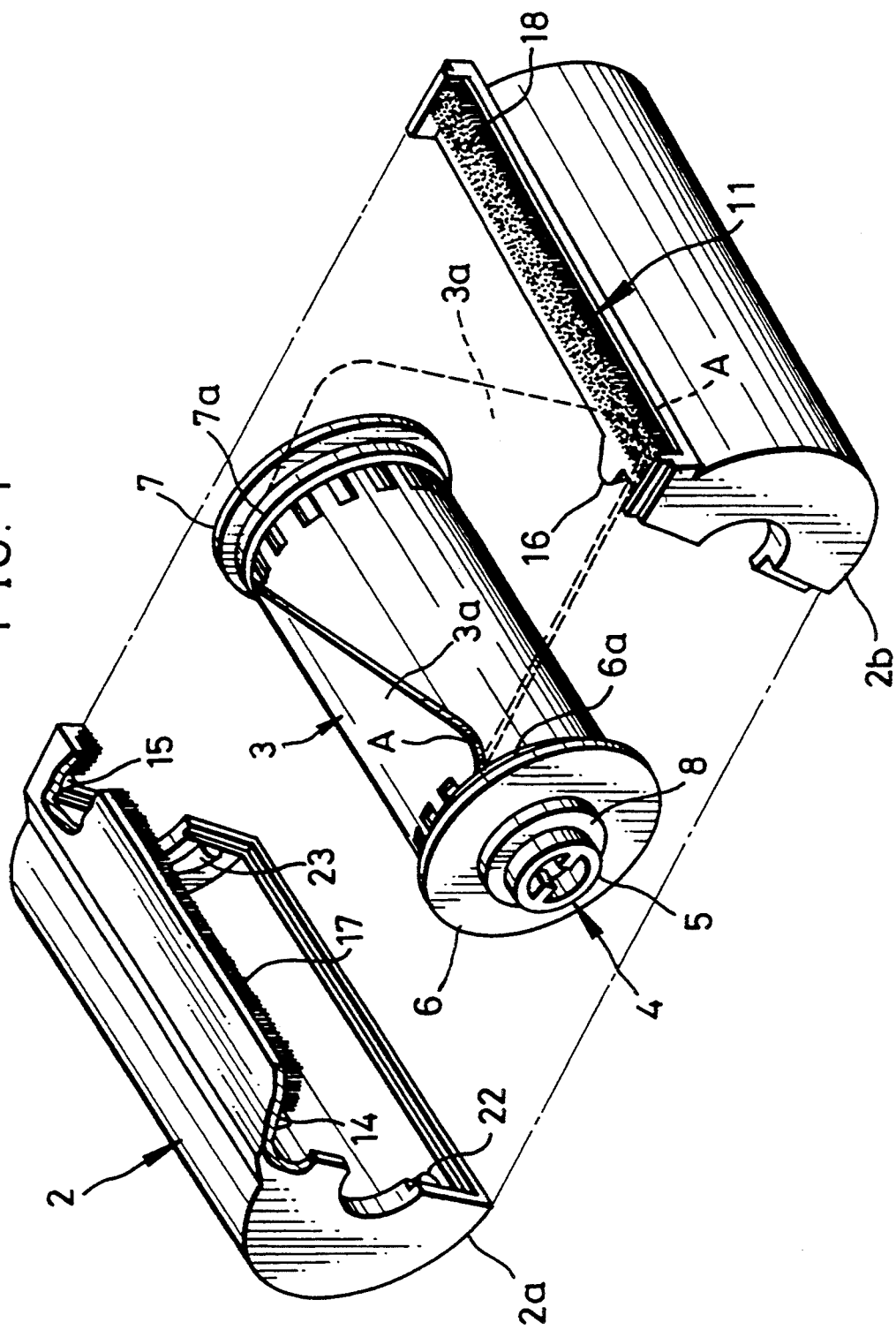
FIG. 1 is an exploded perspective view illustrating a photographic film cassette according to the present invention.
Figure 2:
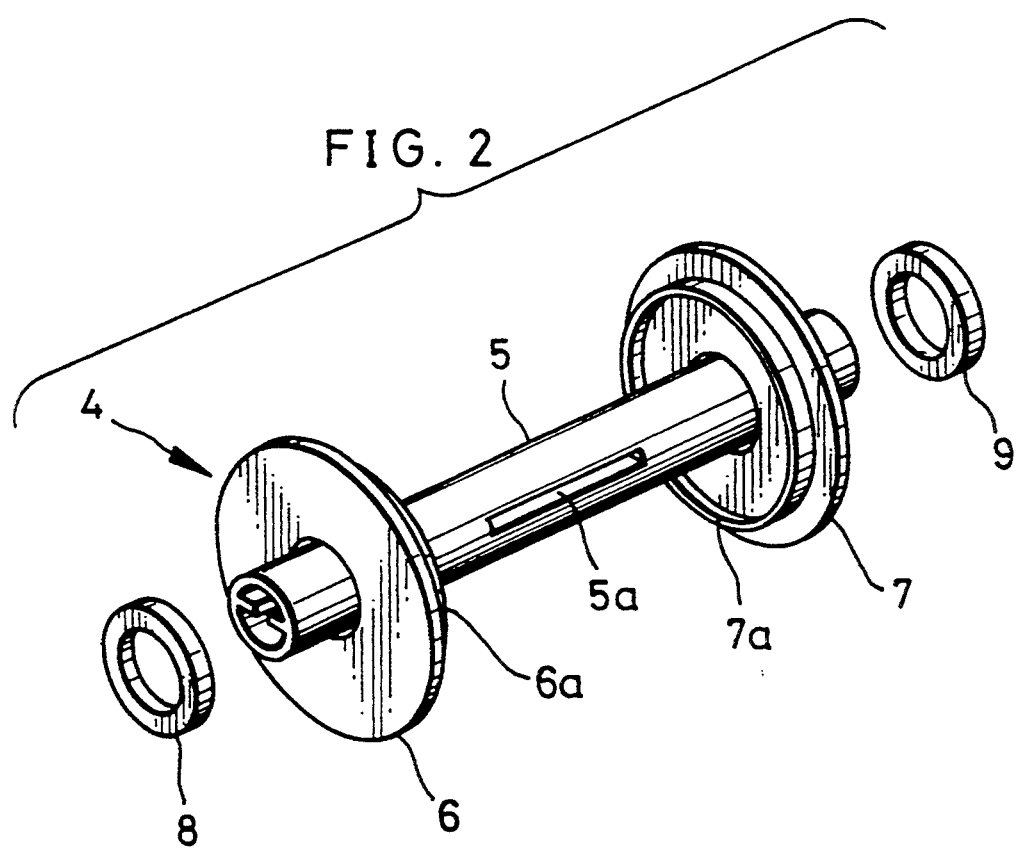
FIG. 2 is a perspective view illustrating a construction of a spool in the film cassette illustrated in FIG. 1.

FIG. 1 illustrates a preferred embodiment of the present invention, in which a photographic film cassette includes a cassette shell 2 and a spool 4. The cassette shell 2 has upper and lower shell halves 2a, 2b, respectively, molded from resin, which rotatably support therebetween the spool 4 with a photographic film 3 wound thereon in a roll. A pair of flanges or disks 6, 7 formed of flexible plastic are rotatably supported on a spool core 5 of the spool 4, as illustrated in FIG. 2. Rings 8, 9 are fitted on the outside of disks 6, 7 to prevent external light from entering a space between the spool core 5 and respective bearing openings of the cassette shell 2.

The inner walls of the disks 6, 7 have opposed circumferential lips 6a, 7a which contact edges of the outermost turn of the film roll 3 to prevent the roll from loosening. The radius of the circumferential lips 6a, 7a is smaller than the radius of the disks 6, 7. The peripheral edges of disks 6, 7 project from the bottom of the circumferential lips 6a, 7a. A slit 5a is formed in the middle of spool core 5 to fix the trailing end of the photographic film 3 by insertion therein.

A film passage mouth 11 is formed between shell halves 2a, 2b for drawing out and rewinding film 3. Triangular guide projections 14, 15 are formed in a film passageway 11a having the film passage mouth 11, on upper shell half 2a. Projections 14, 15 contact the inner periphery of disks 6, 7 to deform the peripheral edges thereof in the widthwise direction of film 3 to release film 3 from the circumferential lips 6a, 7a. A separating claw 16 is formed on the lower shell half 2b, and separates an obliquely cut leading end A of a film leader 3a from the surface of the inner film roll to guide the leading end A to the film passage mouth 11. A pair of light-trapping members 17, 18, or plush, are attached to the upper and lower surfaces of the film passageway 11a to prevent light from entering the cassette shell 2.

Figure 3:
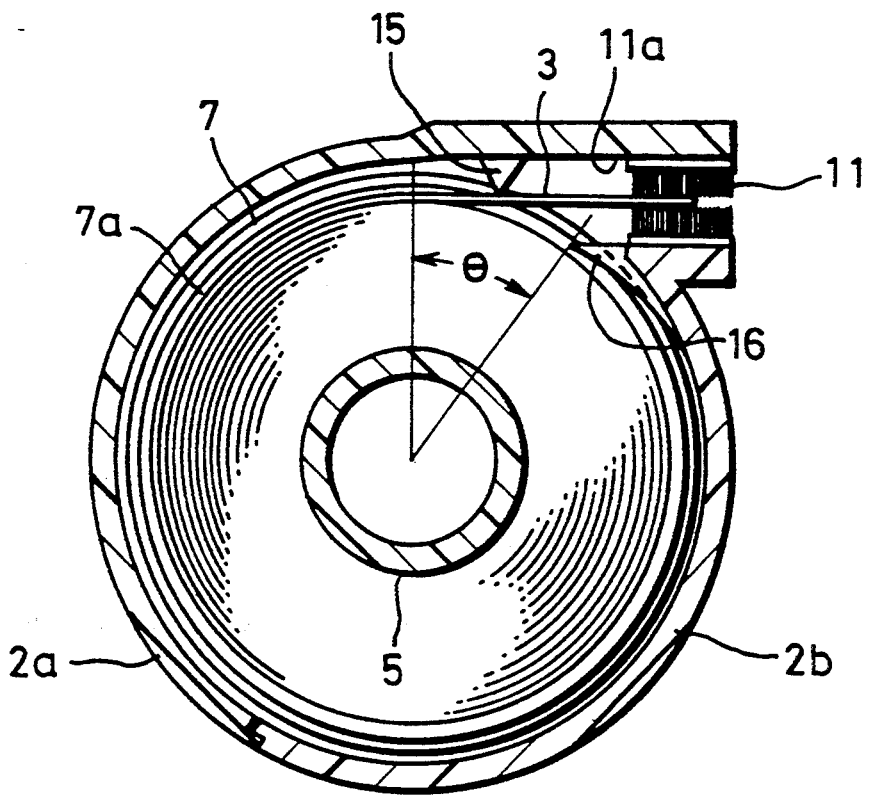
FIG. 3 is a sectional view illustrating a position of guide projections of the film cassette illustrated in FIG. 1.

The range of preventing the release of the film roll versus loosening of film 3 as required for advancing the film leader 3a through mouth 11 will be considered hereinbelow. If guide projections for releasing the film 3 from the circumferential lips 6a, 7a were formed in a position lower than an entrance defined between the film passageway 11a and the film chamber, the rotary force of the spool core 5 would not be transmitted to the outer turns of the film roll because the film 3 would be released excessively. If such guide projections were formed excessively inwardly from the entrance of the film passageway 11a, film 3 also would be released excessively, and might be damaged or bent when passing through the entrance of the film passageway 11a. Accordingly, the range of the minimum necessary degree of releasing film 3 is defined by angle $\Theta$, as illustrated in FIG. 3, formed between the tip of the separating claw 16 and a separation position of the film leader 3a from the film roll when advancing the film leader 3a directly to the film passage mouth 11. Preferably, the guide projections 14, 15 are formed at a position midway between the range of the angle $\Theta$.

Figure 4:
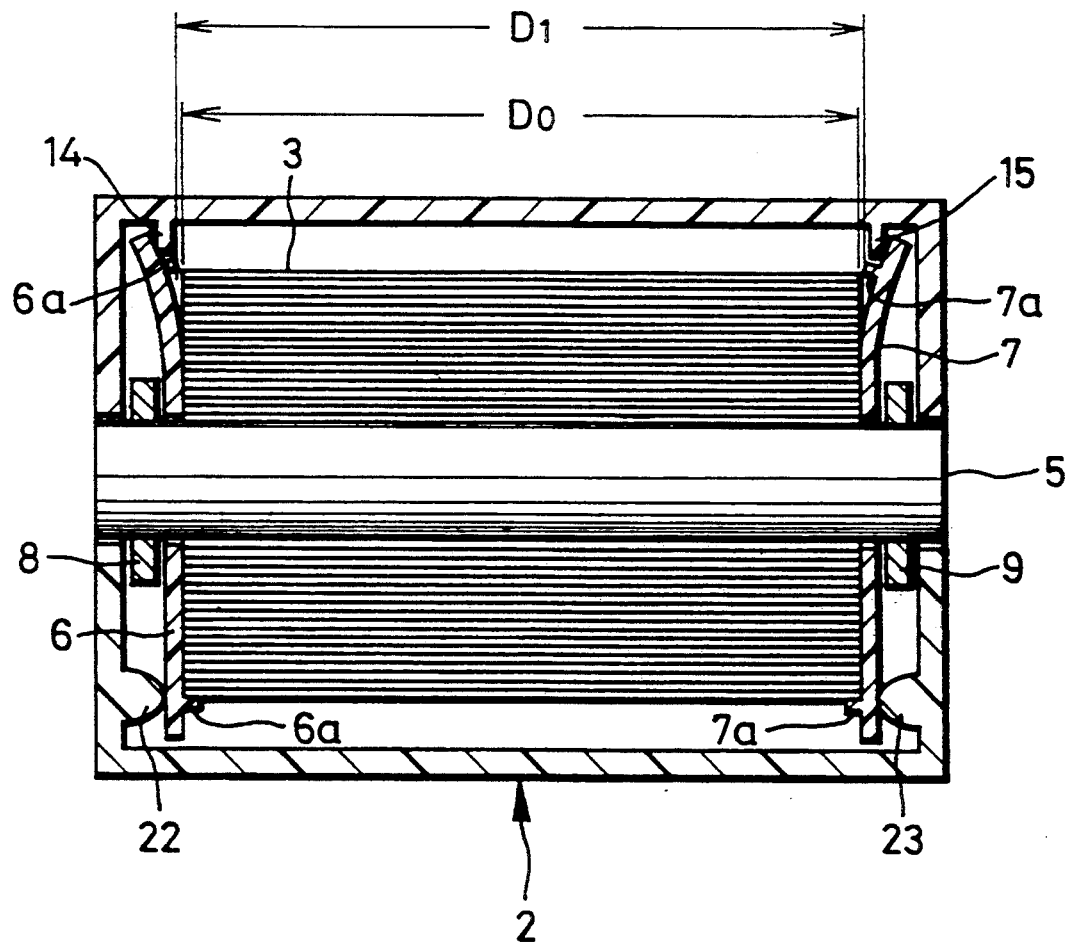
FIG. 4 is a sectional view illustrating positions of the guide projections illustrated in FIG. 3 and disks.

As illustrated in FIG. 4, the guide projections 14, 15 spread the disks 6, 7 in the widthwise direction of film 3 by contacting the inner peripheral edges of disks 6, 7, and are positioned with reference to the widthwise direction of film 3 so that they do not contact film 3 even when the film roll is loosened. According to experimental results, it has been found that the spread distance $D_1$ defined between the tops of the circumferential lips 6a, 7a when spread by the guide projections 14, 15 in the widthwise direction of film 3 is preferably between $(D_0+0.1)$ mm (inclusive) and $(D_0+0.5)$ mm (inclusive) where $D_0$ is the width of film 3. If $D_1$ is less than $D_0+0.1$, the film 3 cannot be covered by the circumferential lips 6a, 7a while rewinding film 3 in the cassette shell 2. If $D_1$ is greater than $D_0+0.5$, it is impossible to advance the film leader 3a by rotating the spool 4 because film 3 is loosened excessively. Ridges 22, 23, formed on the inner walls of the end faces of the shell halves 2a, 2b, contact disks 6, 7 laterally to prevent the film roll from loosening.

When loading a camera with the above-described inventive film cassette, the spool core 5 is rotated in a film advancing direction by a film initial-advance mechanism of the camera. Although film 3 is rotated in the unwinding direction, ridges 22, 23 prevent the disks 6, 7 from spreading outwardly except for near the film passageway entrance. The circumferential lips 6a, 7a contact both lateral edges of the outermost turn of film 3 to prevent further loosening thereof. Thus, rotation of the spool core 5 is transmitted to the film leader 3a to be rotated reliably together with the film roll in the unwinding direction.

Because the ridges 22, 23 do not reach the vicinity of the film passageway entrance, and because the guide projections 14, 15 bend the peripheral edges of disks 6, 7 outwardly, both lateral edges of film 3 are released from the circumferential lips 6a, 7a. When the spool 5 is rotated further, the film leader 3a is separated from the film roll by the separating claw 16 without the film jamming, passes claw 16 on its upper surface, and advances through the film passage mouth 11 and externally of the cassette.

Figure 5:
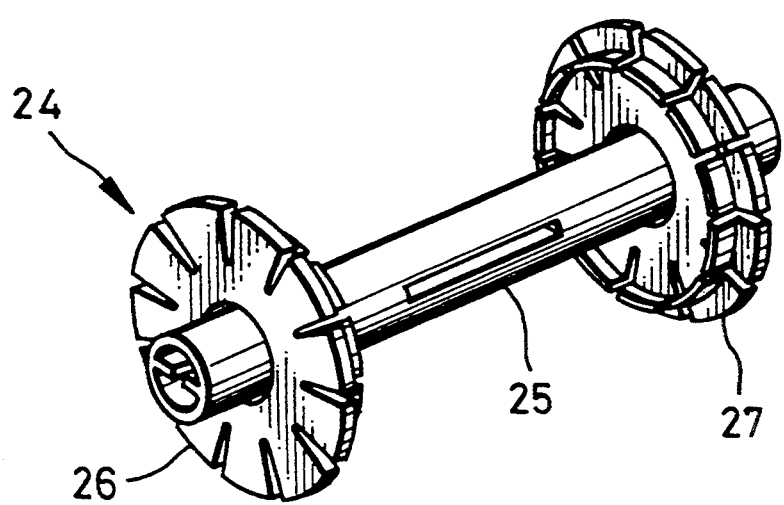
FIGS. 5 to 8 are perspective views illustrating the construction of spools according to other preferred embodiments of the present invention.
Figure 6:
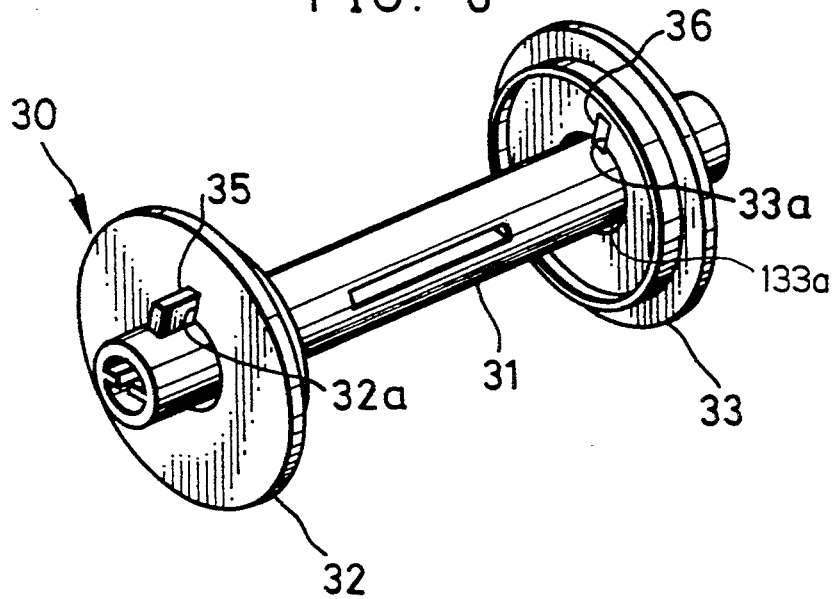

Spools having a construction different from spool 4 of the above-described embodiment are described below with reference to FIGS. 5-8. As shown in FIG. 5, a spool 24 has a spool core 25 and disks 26, 27 rotatably fitted thereon. Disks 26, 27 are split into a plurality of sectors (e.g., ten) by forming slits, thereby to be flexible. A spool 30, as illustrated in FIG. 6, has disks 32, 33 rotatable by rotation of a spool core 31. Rails 35, 36 are formed on both end portions of core 31, and guide grooves 32a, 33a extend from bearing holes 132a and 133a which are formed on the disks 32, 33. Engagement between rails 35 and 36 and guide grooves 32a and 33a, respectively, causes disks 32 and 33 to rotate along with core 31.

Figure 7:
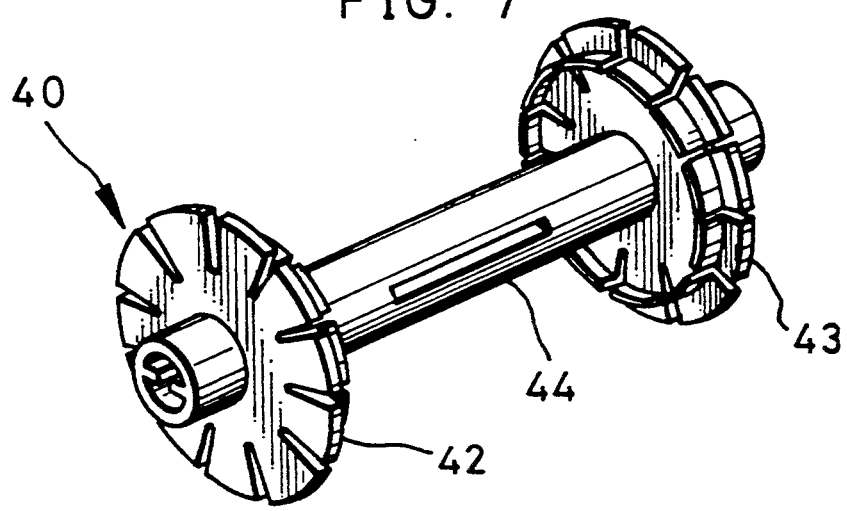
Figure 8:
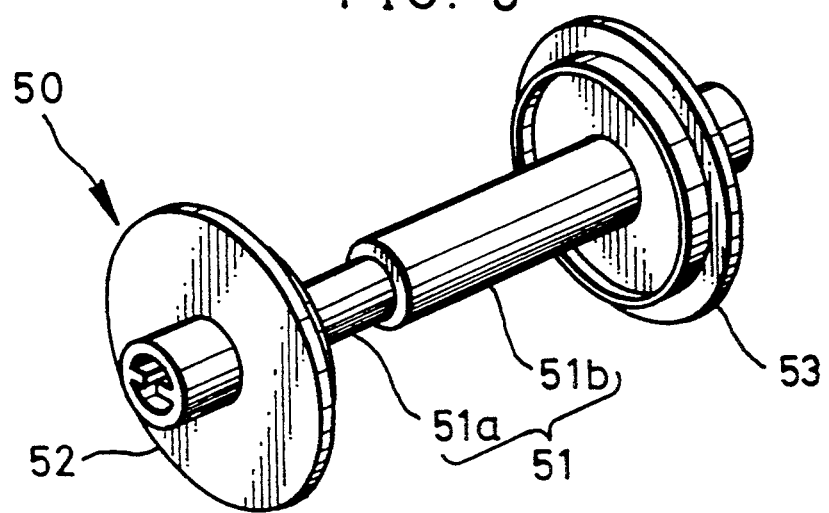

As illustrated in FIG. 7, a spool 40 has a spool core 44 and flanges 42, 43 split into a plurality of sectors by forming slits therein which provide flexibility. The flanges are fixed on or formed integrally with the spool core 44. As illustrated in FIG. 8, a spool 50 has a spool core 51 having two spool pieces 51a, 51b. The spool piece 51a is slidably received in the interior of spool piece 51b such that the spool core 51, for example, has an adjustable length to accommodate films of various widths. Flexible flanges 52, 53 are formed integrally with the spool pieces 51a, 51b, respectively.

Although the present invention has been fully described byway of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photographic film cassette, for containing a photographic film having a film leader, said cassette comprising:

a spool having a core for winding said photographic film thereon in a roll, and first and second flanges defining positions of lateral edges of said film roll;

a cassette shell having a cylindrical film chamber for rotatably containing said spool, said cassette shell also having a film passageway and a film passage mouth defined by said film passageway, wherein rotation of said spool advances said film leader through said film passageway and said film passage mouth outside of said cassette shell;

circumferential lips formed on said flanges to project toward said film roll for contact with edges of an outermost turn of said film roll wherein portions of said peripheral edges of said flanges extend in a direction to enlarge a diameter of said flanges relative to a position of said circumferential lips;

at least one separating claw means positioned in said film passageway for coming into contact with a front edge of said film leader when said spool is rotated, from any position, in an unwinding direction and said photographic film is entirely contained in said film chamber of said cassette shell for separating said film leader from said film roll to guide said film leader to said film passage mouth; and a film releasing mechanism positioned in correspondence to said at least one separating claw means in said cassette shell for pressing peripheral edges of said flanges to separate said peripheral edges from said film roll to release said film roll from said circumferential lips, said film releasing mechanism presses said peripheral edge portions of said flanges to satisfy a condition:

$$D_0 + 0.1 \text{ mm} \leq D_1 \leq D_0 + 0.5 \text{ mm}$$

where $D_1$ is a distance defined between respective tops of said circumferential lips, and $D_0$ is a width of said photographic film.

2. A photographic film cassette as defined in claim 1, wherein said cassette shell includes two shell halves molded from resin.

3. A photographic film cassette as defined in claim 2, wherein said spool comprises:
 a first core portion and a first spool piece formed integrally with said first flange and said first core portion; and
 a second core portion and a second spool piece formed integrally with said second flange and said second core portion, said second core portion slidably receiving said first core portion and having said film roll wound on a periphery thereof.

4. A photographic film cassette as defined in claim 2, further comprising a plurality of light-trapping members attached to first and second surfaces of said film passageway to prevent light from entering into said cassette shell.

5. A photographic film cassette as defined in claim 2, wherein said flanges are fitted loosely on said core.

6. A photographic film cassette as defined in claim 5, wherein bearing holes are formed in said flanges, and guide grooves are formed in said flanges so as to extend from respective ones of said bearing holes, and wherein said cassette further comprises:
 projecting portions formed on said core for slidably engaging in said respective guide grooves to allow rotation of said flanges corresponding to rotation of said core.

7. A photographic film cassette as defined in claim 2, wherein a plurality of slits are formed in said flanges on said peripheral edge portions at a regular interval.

8. A photographic film cassette as defined in claim 7, wherein said slits extend inwardly of said circumferential lips from said peripheral edge portions of said flanges to separate said circumferential lips into a plurality of sectors.

9. A photographic film cassette as defined in claim 8, wherein said flanges and said spool are formed integrally together.

10. A photographic film cassette as defined in claim 1, wherein said film releasing mechanism comprises a plurality of guide projections.

11. A photographic film cassette as defined in claim 10, wherein said guide projections are formed in said film passageway at a position corresponding to where said film leader is separated from said film roll.

12. A photographic film cassette as defined in claim 11, wherein said cassette shell has bearing holes formed thereon, and wherein a plurality of rings are fitted on said core outside said flanges for shielding light incident through said bearing holes formed on said cassette shell.

13. A photographic film cassette as defined in claim 12, wherein a leading end of said film leader is cut obliquely.

14. A photographic film cassette as defined in claim 13, wherein ridges for pressing said first and second flanges against said film roll are formed on inner surfaces of end faces of said cassette shell opposed to said guide projections.

15. A photographic film cassette according to claim 10, wherein said guide projections have a triangular shape.

16. A photographic film cassette as defined in claim 10, wherein said guide projections are formed in a position between an angle formed by a tip of said at least one separating claw mechanism and a separation position of the said film leader from said film roll when said film leader is advanced directly through said film mouth.

17. A photographic film cassette for containing a photographic film having a film leader, comprising:
 a spool having a core for winding said photographic film thereon in a roll, and a pair of flanges for defining edge positions of said film roll;
 a cassette shell for rotatably containing said spool defining a film passageway and a film passage mouth thereby, rotation of said spool advancing said film leader through said film passageway and said film passage mouth externally of said cassette shell;
 circumferential lips formed on said flanges projecting toward said film roll for contact with edges of an outermost turn of said film roll;
 a separating claw mechanism positioned in said film passageway for separating said film leader from said film roll to guide said film leader to said film passage mouth; and
 a film releasing mechanism positioned inwardly of said separating claw mechanism in said cassette shell and pressing peripheral edges of said flanges to be spaced from said film roll to release said film roll from said circumferential lips, said film releasing mechanism pressing said peripheral edges of said flanges to satisfy a condition:

$$D_0 + 0.1 \text{ mm} \leq D_1 \leq D_0 + 0.5 \text{ mm}$$

where $D_1$ is a distance defined between respective tops of said circumferential lips, and $D_0$ is a width of said photographic film.

* * * * *